United States Patent Office 3,697,484
Patented Oct. 10, 1972

---

3,697,484
PREPARATION OF POLYAMIDE-IMIDE ESTERS BASED ON ISOCYANATES, ACID ANHYDRIDES AND LACTONES
Wilfried Zecher, Cologne, and Rudolf Merten, Leverkusen, Germany, assignors to Farbenfabriken Bayer Aktiengesellschaft, Leverkusen, Germany
No Drawing. Filed Dec. 11, 1970, Ser. No. 97,320
Claims priority, application Germany, Dec. 16, 1969, P 19 62 900.6
Int. Cl. C08g 22/00, 22/16
U.S. Cl. 260—77.5 R        3 Claims

ABSTRACT OF THE DISCLOSURE

The invention relates to a process for the preparation of polyamide-imide esters by reacting together a lactone, an acid anhydride, a carboxylic acid and an isocyanate. This process enables polyamide-imide esters to be produced which are distinguished by their particularly high temperature resistance and which are suitable for use as lacquers, foils and compact or foamed mouldings. Their properties can be varied for particular purposes by the addition of fillers, pigments and low molecular weight and high molecular weight components.

---

The invention relates to a process for the preparation of polyamide-imide esters by reacting together a lactone, an acid anhydride, a carboxylic acid and an isocyanate.

Polyamide-imide esters are used especially for electrotechnical purposes, on account of their thermal resistance, e.g. as lacquers, foils and compact or foam mouldings.

It is already known that polyamide-imide esters can be obtained by reacting a diamine and a glycol or an amino alcohol with an acid anhydride and a dicarboxylic acid. This process has, however, the disadvantage that condensation will only proceed under very vigorous conditions and the degree of condensation is generally not accurately reproducible. Therefore, in many cases either low molecular weight imidoesters which have poor mechanical properties or substantially cross-linked and insoluble products are obtained.

It is an object of the present invention to provide a process for the production of polyamide-imide esters which avoids the above-mentioned disadvantages.

This object is accomplished by a process for the preparation of polyamide-imide esters which is characterised in that a polyisocyanate is reacted with a lactone and a cyclic carboxylic acid anhydride which contain at least one additional carboxylic acid group, the reaction being carried out at a temperature of between −20 and +450° C., optionally in a solvent and optionally in the presence of a polycondensation catalyst.

This method yields, for example, polyamide-imide esters which contain the recurrent structural elements:

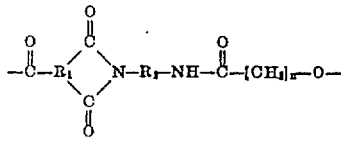

in which $R_1$ represents an organic radical which is at least trivalent and $R_2$ represents an organic radical which is at least divalent and $n$ represents an integer of from 2 to 20.

The process according to the invention can be used for the preparation of high molecular weight amide-imide esters under conditions in which, in contrast to the usual esterification processes, the only readily volatile reaction product is carbon dioxide, so that subsequent decomposition of the amide and imide bonds is prevented. Furthermore, the anhydrous reaction medium enables the process to be carried out in the presence of or with an excess of the compounds which react with water, e.g. the isocyanates and the acid anhydrides. Surprisingly, in contrast to the reaction of acid anhydrides with isocyanates, in which numerous side reactions are generally observed, the products obtained are predominantly high molecular weight condensation products which are readily soluble.

Suitable lactones for the process according to the invention are, for example, lactones of the general formula:

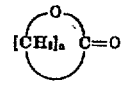

in which $n$ represents an integer of from 2 to 20. These lactones may be prepared by conventional processes. The following are examples:

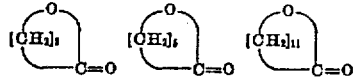

These lactones may also be substituted with alkyl and aryl groups, e.g.

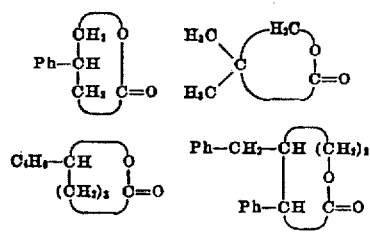

Compounds of the general formula:

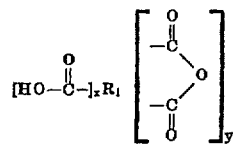

in which $R_1$ represents an optionally substituted aliphatic, aliphatic-aromatic or aromatic radical and $x$ and $y$ represent integers of from 1 to 3 are suitable cyclic dicarboxylic acid anhydrides which contain at least one additional carboxylic acid group. In the above formula $R_1$ may represent an aliphatic, cycloaliphatic or aromatic radical or a higher molecular weight polyether, polyester, polyhydantoin, polyurea, polyurethane, polyamide or polyimide radical. These radicals may also be substituted once or several times, e.g. by alkyl, halogen, nitro, alkoxy, aroxy, carbalkoxy, carbaroxy, and cyano groups. The following are examples of such compounds:

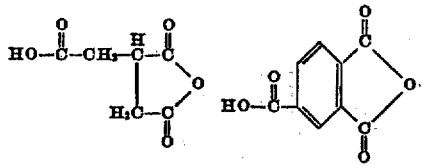
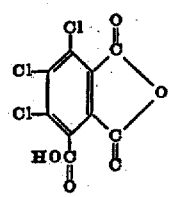
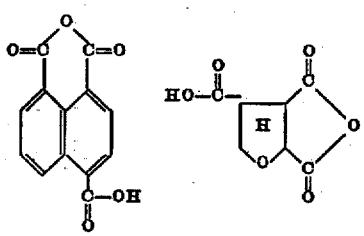
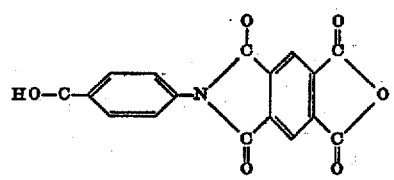
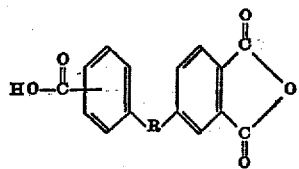

R=—O—, —S—, —SO₂—, —C(=O)—, —N=N—

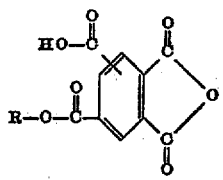

R=alkyl or aryl

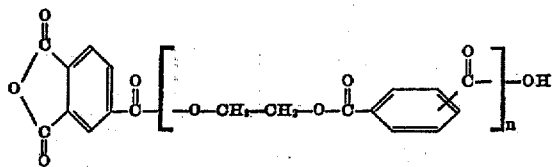

The compound preferably used in trimellitic acid anhydride. Instead of carboxylic acid anhydride carboxylic acids, one may also use compounds which, like polycarboxylic acids or their phenyl esters, can be converted into carboxylic acid anhydride carboxylic acids during the course of the reaction. Furthermore, the carboxylic acid anhydride carboxylic acid may be replaced by a mixture of carboxylic acids which are at least bifunctional and bifunctional cyclic carboxylic acid anhydrides.

Suitable polyisocyanates for the process according to the invention are those of the general formula:

$$R_2[N=C=O]_z$$

in which $R_2$ represents an optionally substituted aliphatic, aliphatic-aromatic or aromatic radical and $z$ represents an integer of from 2 to 3. $R_2$ may, for example, also represent a higher molecular weight polyether, polyester, polyhydantoin, polyurea, polyurethane, polyamide or polyimide radical. The following are mentioned as examples:

O=C=N—[CH₂]₆—N=C=O

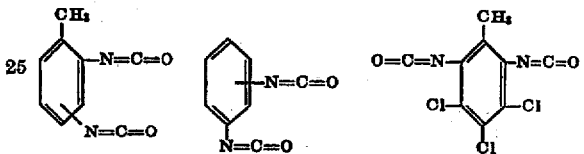
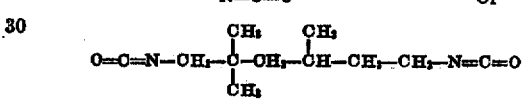
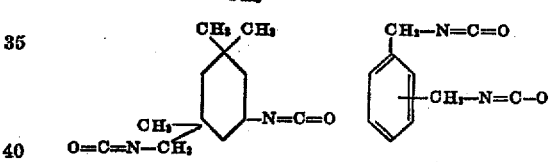

R=—CH₂—, —O—, —S—, —SO₂—

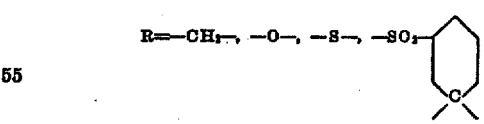

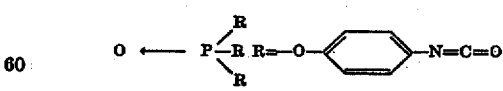

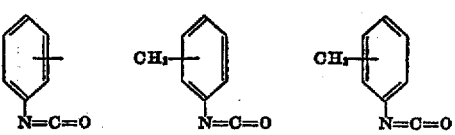

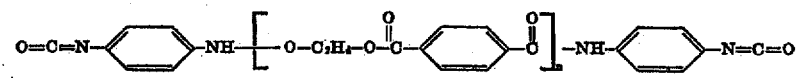

The following are used for preference: 4,4'-diphenyl-methane diisocyanate, 2,4- and 2,6-toluylene diisocyanate and hexamethylenediisocyanate.

Instead of the polyisocyanates, substances which decompose to yield isocyanates, e.g. addition products of phenols, hydrocyanic acid and CH acidic compounds, e.g. of ethylacetoacetate, may be used. Derivatives of isocyanates which resemble ureas and alkyl carbamic acid esters in that they can be reacted with a cyclic acid anhydride to yield an imide and with a carboxylic acid to yield an amide may also be used as the starting materials.

The process according to the invention may be represented by the following reaction scheme:

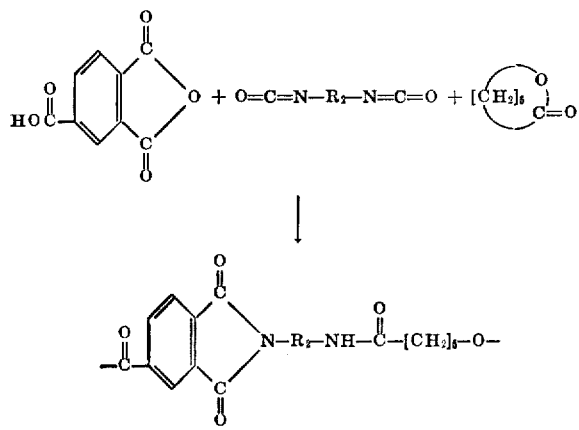

To carry out the process of the invention, the reactants are reacted over a period of time from a few minutes up to several hours at a temperature in the range of −20° to +450° C., preferably +20° to +300° C., optionally in the presence of a solvent. The progress of the reaction can be followed by observation of the evolution of gas. Nitrogen and argon may be used as protective gases, especially at elevated temperatures. In some cases it is advantageous to carry out the reaction in several stages, for example addition products or condensates may then be prepared in the first stage and these may then be converted into the high molecular weight polyamide-imide ester in an elevated temperature, if necessary with chain lengthening or crosslinking. The reactants are generally used in such proportions that their reactive groups are used in equivalent amounts, but substantial deviations from these stoichiometric ratios are possible.

In addition, other polyfunctional substances may be built into the amide-imide ester system, e.g. diamines, polyester, polyethers, polyhydantoins and polyurethanes having terminal carboxyl, hydroxy or isocyanate groups, diols, triols, aminoalkanols, lactams and polycarboxylic acids. Thus a synthetic resin which is especially suitable for use as a wire lacquer is obtained by the addition of a polyester of terephthalic acid, ethylene glycol and glycerol.

The reaction according to the invention may be carried out in a solvent which does not react with the components under the reaction conditions or only forms loose addition compounds or compounds which will enter into subsequent reactions. Suitable solvents are: (halogenated) hydrocarbons, phenols, esters, ketones, ethers, substituted amides, sulphoxides and sulphones, for example o-dichlorobenzene, xylene, phenol, cresol, acetophenone, diglyme, glycolmonomethylether acetate, N-methylpyrrolidone, dimethylformamide, dimethylsulphoxide, dimethylsulphone and mixtures thereof. Commercial cresol mixtures and N-methylpyrrolidone are used for preference.

The course of the reaction according to the invention may be accelerated by suitable polycondensation catalysts, e.g. by boron fluorides and its addition products, mineral acids such as phosphoric acid and phosphorous acid, boric acid, carboxylic acids, ferric chloride, zinc chloride, cobalt naphthenate, triethylenediamine, phenyl-methyl-phospholine oxide, trialkylphosphine, zinc octoate, dialkyl tin diacylates, lead oxide, antimony oxide, iron acetyl-acetonate and titanium tetrabutylate.

The process according to the invention enables polyamideimide esters to be produced which are distinguished by their particularly high temperature resistance and which are suitable for use as lacquers, foils and compact or foamed mouldings. Their properties can be varied for particular purposes by the addition of fillers, pigments and low molecular weight and high molecular weight components.

The following examples are to further illustrate the invention without limiting it.

EXAMPLE 1

96 g. (0.5 mol) of trimellitic acid anhydride, 125 g. (0.5 mol) of 4,4'-diisocyanato-diphenylmethane and 39.6 g. (0.55 mol) of propiolactone are introduced into 250 g. of a commercial cresol mixture. The mixture is now heated and the temperature raised to 200° C. over about 8 hours. Condensation proceeds with the evolution of carbon dioxide. The temperature is raised at such a rate that vigorous but still easily controlled evolution of the gas is maintained throughout. In the course of the reaction, the reaction mixture at first becomes cloudy but after a few hours is converted into a clear solution at 200° C. Cresol is now distilled off while simultaneously the temperature is raised until it reaches 225 to 230° C., stirring is continued for 3 hours at this temperature, and after cooling the reaction mixture to 200° C., the solvent which has been distilled off is returned to the reaction mixture. The polyamide-imide ester is obtained as a clear, viscous solution.

A sample is diluted to about 30% with cresol, painted on a metal plate and stoved, first at 200° C. and then at 300° C. to produce a clear elastic foil.

*Analysis.*—Calculated (percent): C, 70.1; H, 4.3; N, 6.5. Found (percent): C, 70.3; H, 4.2; N, 6.5.

The IR spectrum contains the following characteristic bands:

Imide: 1780 cm.$^{-1}$; ester+imide: 1715–1730 cm.$^{-1}$; amide: 1680 cm.$^{-1}$.

Examples 2–10 are carried out by the general method described in Example 1.

EXAMPLE 2

125 g. (0.5 mol) of 4,4'-diisocyanato-diphenylmethane, 96 g. (0.5 mol) of trimellitic acid anhydride and 57 g. (0.5 mol) of caprolactone are condensed in cresol, finally at 235° C. A clear solution which when diluted to 16% has a viscosity of 590 cp. at 25° C. is obtained.

A 25% solution of the polyimide ester is painted on a glass plate and stoved at 200° and 300° C. to produce a lacquer film.

Calculated (percent): C, 71.7; H, 5.1; N, 6.0. Found (percent): C, 71.4; H, 5.1; N, 6.0.

IR: Imide: 1775 cm.$^{-1}$; imide+ester: 1700–1730 cm.$^{-1}$; amide: 1675 cm.$^{-1}$.

EXAMPLE 3

87 g. (0.5 mol) of toluylene-(2,4)-diisocyanate, 114 g. (1 mol) of caprolactone and 96 g. (0.5 mol) of trimellitic acid anhydride are reacted together in 240 g. of cresol, finally at 225° C., to yield the polyamide-imide ester. A 25% solution is stoved on a metal sheet at 200° and 300° C. to produce a lacquer film.

Calculated (percent): C, 66.4; H, 5.9; N, 5.5. Found (percent): C, 66.5; H, 5.8; N, 5.8.

IR: Imide: 1780 cm.$^{-1}$; imide+ester: 1715–1735 cm.$^{-1}$; amide: 1680 cm.$^{-1}$.

EXAMPLE 4

36 g. (0.5 mol) of propiolactone, 125 g. (0.5 mol) of 4,4'-diisocyanato-diphenylmethane and 96 g. (0.5 mol) of trimellitic acid anhydride are reacted together in 250 g. of cresol. 0.5 g. of lead oxide and 1.0 g. of zinc octoate are added as catalyst at 200° C. After termination of the reaction at 225° C., the polyamide-imide ester is obtained as a clear solution which is diluted to 25% and with the addition of 1% of titanium tetrabutylate is stoved at 200° and 300° C. to produce a hard lacquer film.

N: Calculated: 6.6%; found: 6.3%.

IR: Imide: 1780 cm.$^{-1}$; ester+imide: approximately 1725 cm.$^{-1}$; amide: 1680 cm.$^{-1}$.

EXAMPLE 5

11.3 g. (0.1 mol) of caprolactam, 45.6 g. (0.4 mol) of caprolactone, 125 g. (0.5 mol) of 4,4'-diisocyanato-diphenylmethane and 96 g. (0.5) of trimellitic acid anhydride are condensed in 270 g. of cresol to yield the polyamide-imide ester. The viscosity of a 16% solution in cresol is 330 cp. at 25° C.

A 25% solution is stoved at 190° and 270° C. to produce an elastic lacquer film.

EXAMPLE 6

The reaction product of 84 g. (0.5 mol) of hexamethylene diisocyanate, 36 g. (0.5 mol) of propiolactone and 96 g. (0.5 mol) of trimellitic acid anhydride in 220 g. of cresol is diluted with phenol/cresol 1:1 to a 15% solution, painted on a metal plate and heated, first for 20 minutes at 180° C. and then for 20 minutes at 290° C. A clear, hard lacquer film is obtained.

Calculated (percent): C, 62.9; H, 5.8; N, 8.1. Found (percent): C, 63.0; H, 5.7; N, 8.2.

IR: Imide 1770 cm.$^{-1}$; imide+ester: 1700–1725 cm.$^{-1}$; amide:broad band at around 1660 cm.$^{-1}$.

EXAMPLE 7

87 g. (0.5 mol) of toluylene-(2,4)-diisocyanate, 96 g. of trimellitic acid anhydride and 57 g. (0.5 mol) of caprolactone are reacted together in 240 g. of phenol. The resulting solution of the polyamide-imide ester is diluted to 25% with phenol/xylene 2:1 and stoved on a glass plate at 190° and 270° C. to produce an elastic foil.

Calculated (percent): C, 67.4; H, 5.1; N, 7.2. Found (percent): C, 66.9; H, 4.9; N, 7.2.

IR: Imide: 1780 cm.$^{-1}$; imide+ester: 1720–1735 cm.$^{-1}$; amide: 1680 cm.$^{-1}$.

EXAMPLE 8

28.5 g. (0.25 mol) of caprolactone, 96 g. (0.5 mol) of trimellitic acid anhydride and 125 g. (0.5 mol) of 4,4'-diisocyanatodiphenylmethane are condensed in 250 g. of cresol to yield the polyamide-imide ester. The viscosity of a 16% solution of the reaction product in cresol is 290 cp. at 25° C. A sample is diluted to form a 25% solution with cresol/xylene 2:1 and stoved on a metal sheet at 200° C. and 310° C.

IR: Imide: 1775 cm.$^{-1}$; imide+ester: broad band around 1730 cm.$^{-1}$; amide: 1680 cm.$^{-1}$.

EXAMPLE 9

21.5 g. (0.25 mol) of butyrolactone, 62.5 g. (0.25 mol) of 4,4'-diisocyanatodiphenylmethane and 48 g. (0.25 mol) of trimellitic acid anhydride are reacted together in 130 g. of cresol, the temperature being 230° C. in the final stage. A viscous solution of the polyamide-imide ester is obtained. This is diluted to 25% with cresol and stoved on a metal sheet at 200° and 300° C. to produce a hard lacquer film.

N: Calculated: 6.4%, found: 6.5%.

EXAMPLE 10

36.0 g. (0.5 mol) of propiolactone, 56.6 g. (0.5 mol) of caprolactam, 250 g. (1 mol) of 4,4'-diisocyanato-diphenylmethane and 192 g. (1 mol) of trimellitic acid anhydride are condensed in 520 g. of cresol to yield the polyamide-imide ester. The viscosity of a sample of the reaction mixture diluted with cresol to 16% is 555 cp. at 25° C. Another sample is diluted with cresol to form a 25% solution and stoved to produce an elastic lacquer film on a copper wire in a wire lacquering machine which is maintained at 400° C. and through which the wire passes at the rate of 7 m./min.

IR: Imide: 1777 cm.$^{-1}$; imide+ester: 1710–1730 cm.$^{-1}$; amide: broad band around 1670 cm.$^{-1}$.

Another sample of the reaction mixture is treated with equal parts, based on the solids content, of a condensation product of terephthalic acid, ethylene glycol and glycerol and 1.2% of titanium tetrabutylate, and stoved on a glass plate at 200° C. and 300° C. to produce an elastic foil.

What we claim is:

1. A polyamide-imide ester comprising the recurrent structural units of the general formula

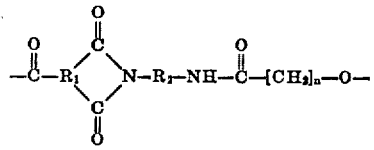

wherein $R_1$ represents an organic radical which is at least trivalent,
$R_2$ represents an organic radical which is at least divalent, and
$n$ represents an integer of from 2–20.

2. The polyamide-imide ester as claimed in claim 1, wherein $R_1$ represents an at least trivalent radical selected from the group consisting of an aliphatic, a substituted aliphatic, an aliphatic-aromatic, and an aromatic radical,
$R_2$ represents an at least divalent radical selected from the group consisting of an aliphatic, a substituted aliphatic, an aliphatic aromatic, an aromatic, a polyether, a polyester, a polyhydantoin, a polyurea, a polyurethane, a polyamide, and a polyimide radical, and
$n$ represents an integer of from 2 to 20.

3. The polyamide-imide ester as claimed in claim 1, wherein $R_1$ represents the trivalent 1,2,4-benzene radical,
$R_2$ represents the 4,4'-diphenylmethane, 2,4-toluylene, 2,6-toluylene or 1,6-hexamethylene radical, and
$n$ represents the integers 2, 3 or 5.

References Cited

UNITED STATES PATENTS

| | | | |
|---|---|---|---|
| 3,578,638 | 5/1971 | Fang. | |
| 3,578,639 | 5/1971 | Sheffer. | |
| 3,620,996 | 11/1971 | Matsumura et al. | |
| 3,560,446 | 2/1971 | Zeche et al. | 260—77.5 |
| 3,248,373 | 4/1966 | Barringer | 260—77.5 |
| 3,186,971 | 6/1965 | Hostettler et al. | 260—77.5 |

DONALD E. CZAJA, Primary Examiner

H. S. COCKERAM, Assistant Examiner

U.S. Cl. X.R.

260—2.5 A, 47 CZ, 75 NH, 75 NP, 75 NQ, 77.5 R, 78 TF